United States Patent [19]

Tsushima et al.

[11] Patent Number: 5,872,989
[45] Date of Patent: Feb. 16, 1999

[54] PROCESSOR HAVING A REGISTER CONFIGURATION SUITED FOR PARALLEL EXECUTION CONTROL OF LOOP PROCESSING

[75] Inventors: Yuji Tsushima, Kokubunji; Yoshikazu Tanaka, Tokorozawa; Yoshiko Tamaki, Kodaira, all of Japan

[73] Assignee: Hitachi, Ltd., Tokyo, Japan

[21] Appl. No.: 934,061

[22] Filed: Sep. 19, 1997

[30] Foreign Application Priority Data

Sep. 20, 1996 [JP] Japan .................................. 8-249594

[51] Int. Cl.[6] .................................................. G06F 15/76
[52] U.S. Cl. ................................. 395/800.23; 395/393
[58] Field of Search ..................... 395/800.01, 800.23, 395/800.32, 376, 384, 393, 580, 588

[56] References Cited

U.S. PATENT DOCUMENTS

| | | | |
|---|---|---|---|
| 4,752,873 | 6/1988 | Shonai et al. | 395/800.23 |
| 5,519,881 | 5/1996 | Yoshida et al. | 395/384 |
| 5,524,262 | 6/1996 | Colwell et al. | 395/800.23 |
| 5,581,721 | 12/1996 | Wada et al. | 395/376 |
| 5,630,149 | 5/1997 | Bluhm | 395/393 |
| 5,694,564 | 12/1997 | Alsup et al. | 395/392 |
| 5,740,414 | 4/1998 | Tovey et al. | 395/580 |
| 5,758,112 | 5/1998 | Yeager et al. | 395/393 |

FOREIGN PATENT DOCUMENTS 5-233279 9/1993 Japan .
6-202866 7/1994 Japan .

OTHER PUBLICATIONS

Rau et al, "Code Generation Schema for Modulo Scheduled Loops", *IEEE*, pp. 158 –169, 1992.

Fujii et al, "A Register File Architecture for Instruction Level Prallel Processing and its Evaluation", 1993, Central Research Laboratory, Hitachi, Ltd., pp. 307 –314.

*Primary Examiner*—Alpesh M. Shah
*Attorney, Agent, or Firm*—Antonelli, Terry, Stout & Kraus, LLP

[57] ABSTRACT

A method and apparatus for handling a large-capacity register file by using a small instruction field as to support a software pipeline. The invention includes a register file having a plurality of physical registers corresponding to a plurality of physical register numbers and a converter which converts logical register numbers included in instructions to be executed into physical register numbers. A physical register, which is used when a logical register is accessed as a result of execution of an instruction, is specified by a pointer corresponding to the logical register number included in the instruction. The pointer used for the access is incremented if so specified in the instruction to ensure that subsequent instructions making access to the same logical register use different physical registers.

52 Claims, 9 Drawing Sheets

```
DO I = 0,5
    S0
    S1
    S2
    S3
END_DO
```

| | | |
|---|---|---|
| MTSPR | FR0,0 | (1) |
| MTSPR | FR1,1 | (2) |
| MTSPR | FR2,1 | (3) |
| MTSPR | FR3,10 | (4) |
| LDF | FR0.q,U(1) | (5) |
| LDF | FR10.n,R | (6) |
| loop: LDF | FR0.q,U(K) | (7) |
| FADD | FR3.q,FR2.q,FR0.q | (8) |
| STF | FR3.n,Z(K) | (9) |
| FMUL | FR5.q,FR3.q,FR10.n | (10) |
| FADD | FR6.q,FR5.q,FR1.q | (11) |
| STF | FR6.q,X(K) | (12) |
| brc | loop | (13) |

FIG. 10

| | | |
|---|---|---|
| LDF | FR0.q,U(1) | (1) |
| LDF | FR10.n,R | (2) |
| loop: LDF | FR0.q,U(K) | (3) |
| FMOV | FR1.q,FR0.n | (4) |
| FADD | FR2.q,FR0.q,FR1.q | (5) |
| FMOV | FR7.q,FR0.n | (6) |
| STF | FR2.n,Z(K) | (7) |
| FMOV | FR3.q,FR2.q | (8) |
| FMUL | FR5.q,FR3.q,FR10.n | (9) |
| FADD | FR6.q,FR5.q,FR7.q | (10) |
| STF | FR6.q,X(K) | (11) |
| brc | loop | (12) |

PROCESSOR HAVING A REGISTER CONFIGURATION SUITED FOR PARALLEL EXECUTION CONTROL OF LOOP PROCESSING

BACKGROUND OF THE INVENTION

The present invention relates to a method and apparatus that performs instruction level parallel processing. More particularly, the present invention relates to a method and apparatus including a register configuration suited for a software pipeline which is a software technique that makes the instruction level parallel processor function effective, and to a processor having such a register configuration.

The performance of a computer is determined by a machine cycle and the number of clock cycles per instruction (CPI). Hence, it is important to reduce the machine cycle and the CPI in improving the performance of a computer. Conventional techniques for reducing the CPI include organizing instructions into a software pipeline and an instruction level parallel processing as represented by superscalar processing and very long instruction word (VLIW) processing.

The pipeline is a parallel processing technique that divides the execution of a single instruction into a plurality of small stages, such as fetch, decode, execute and writeback, and simultaneously executes a plurality of instructions among the stages. This pipeline theoretically can make the CPI equal to a unit by processing each stage in one machine cycle.

Instruction level parallel processing can execute a larger number of instructions simultaneously by performing the pipeline on a plurality of instructions at once and aims at realizing the CPI of less than 1. The difference between superscalar and VLIW processing in terms of instructions performed at the same time is that for superscalar processing, executable instructions are selected dynamically from an instruction sequence by hardware and then executed, whereas VLIW processing has an instruction format that allows specifying a plurality of operations with a single instruction, with the simultaneously executable operations being statically set in an instruction by the compiler.

In using the processor employing these techniques, what is most important is to arrange instructions by the compiler so as to keep the pipeline filled with valid instructions. This is more important for the VLIW system that do not have the function to select executable instructions dynamically. The software technique for arranging instructions by the compiler in a software pipeline is hereinafter referred to as SWPL. The SWPL divides an instruction sequence of a loop body shown in FIG. 1 into a plurality of lumps (hereinafter referred to as stages of SWPL) based on the dependency relationship between instructions and the number of resources and then puts new iteration stages into the pipeline for each machine cycle called a prologue interval, as shown in FIG. 2. As a result, in an ideal steady state interval, all the stages with different iterations (iteration is a single loop in the loop processing) are executed at once, so a high level of parallelism can be obtained, allowing efficient use of the processor that performs the instruction pipeline and the instruction level parallel processing. Thereafter a decreasing number of iteration stages are executed until the end of the instruction sequence in a epilogue interval.

With the processor that has only ordinary registers, however, when there is a read operation for the same register that has been written into, because the correct order of the read with respect to the write must be guaranteed, it is necessary that the write into the register in the subsequent iteration be scheduled after the read from the register in the current iteration. That is, the write and the read for the same register must be sequenced. Thus, the number of instructions that can possibly be executed simultaneously decreases, giving rise to the problem of reduced effectiveness of the software pipeline.

Regarding this problem, there is disclosed in "A Register File Architecture For Instruction Level Parallel Processing and Its Evaluation" by H. Fuji, et al, Parallel Processing Symposium JSPP'93, pages 307–314, 1993 (referred to as a first conventional technique), a method whereby a physical register of queue structure and a pointer for read/write of physical registers are provided for each logical register specified by an instruction. The pointer is incremented by a register control field in a logical register specification field of the instruction according to whether read or write is specified. By advancing the pointer when writing the data into the register, it is possible to control the register writing associated with the same instruction so that the write can be made to different physical registers at different iterations, which in turn allows the write to the same logical register at a subsequent iteration to be executed prior to the read. "Code Generation Scheme For Modules Scheduled Loops" by B. Ramakrishna, et al., IEEE, pp 158–169, 1992 (referred to as a second conventional technique), proposes a method in which a base register for a physical register is provided, wherein an access is made to the physical register according to a value, which is the sum of the logical register number specified by the instruction and the value of the base register; and wherein the base register is decremented each time a new software pipeline (SWPL) stage is thrown in. In this method, because the write of subsequent iteration is thrown in as a new SWPL stage, even the same logical register numbers have different base register values and can obtain different physical register numbers, thus allowing the write of subsequent iteration to be performed before the read operation.

In the first conventional technique, when ordinary use of register during the execution of instructions is considered, a number of same logical registers are sometimes read out overlapping different SWPL stages in order to reuse as many register values as possible. In that case, this technique performs control to update the pointer by only the last register read and use the same physical register for the remaining accesses. Thus, because the write of subsequent iteration cannot be executed before the last read, the prologue interval increases. In the event that a reuse of register beyond the current SWPL stage occurs, it is necessary to insert a copy instruction to make the interval from register definition to register use less than the initiation interval. This gives rise to a problem of software overhead due to copy instruction and consumption of logical registers for the copy operation.

Further, because each logical register has an independent physical register, a value defined by a certain logical register number cannot be read out by another logical register. Hence, even if there are a sufficient number of physical registers as a whole, only the physical registers associated with the logical registers used by the instructions are used, deteriorating the utilization of the physical registers.

In the second conventional technique, because the field representing a logical register in an instruction must be able to specify all physical registers, the register field increases with the capacity of the physical registers. Another problem is that because the base register and logical register numbers are added up when making a register access, the register access time may increase. The former problem, in particular, becomes large when a VLIW is used because a number of register specifying fields are contained in one instruction. Further, an instruction for updating the base register at each repetition of loop must be added and this results in a software overhead.

SUMMARY OF THE INVENTION

The object of this invention is to enable the handling of a large capacity register file without fragmentation of physical registers by using a small register specifying field in order to (1) support SWPL without causing software overhead and (2) allow the use of the processor in the VLIW system.

To achieve the above object, the processor of the present invention has, in each logical register field specified by an instruction, a field for specifying a read pointer or write pointer that can specify an arbitrary physical register, and a field for the control of incrementing or not incrementing the pointer. When the kind of access associated with the logical register field in the instruction is determined as a result of decoding an opcode, the processor reads a value from the read pointer or write pointer based on a value in the pointer specification field of the logical register field as an index; and then accesses the register file based on the read value of the pointer as a physical register number. The processor also includes apparatus for setting an initial value for the read pointer and write pointer.

For instructions with a specification to increment the pointer, the processor allows the write of different iterations to use different physical registers, which means that the write of subsequent iteration can be executed prior to the read. Further, since the read pointer and the write pointer can be specified with an arbitrary physical register, the pointers associated with different logical registers can point to the same physical registers. Hence, a value written into by a certain logical register number can be read out by another logical register number.

When the same physical register value is to be reused beyond the prologue interval of SWPL, a step is taken to ensure that read pointers of different logical register numbers point to the same physical register so that a value defined by a certain logical register number can be read out by another logical register number. This eliminates the need for an additional copy instruction used to shorten the time from the register definition to the register use. Further, because the read pointer and write pointer are incremented automatically by the execution of an instruction that has a specification for incrementing, there is no need to execute a special instruction for changing the physical registers to be used.

Another feature of the present invention is that because the read pointer and write pointer of each logical register number can point to an arbitrary physical register, fragmentation of the physical register can be prevented. The number of physical registers is limited by the width of the read pointer and write pointer, and is not influenced by the size of the register specifying field in the instruction. Therefore, even when the register field is about equal in size to that of the conventional processor, the processor of the present invention can handle a large capacity register file.

BRIEF DESCRIPTION OF THE DRAWINGS

The present invention will be more apparent from the following detailed description, when taken in conjunction with the accompanying drawings, in which:

FIG. 9 is a diagram illustrating an example of the program of FIG. 7 in an assembly language of a virtual processor having the register configuration of the present invention;

FIG. 10 is a diagram illustrating an example of the program of FIG. 7 in an assembly language of a virtual processor having the register configuration of a first conventional technique;

DESCRIPTION OF THE PREFERRED EMBODIMENTS

Embodiment 1

Figures 1, 2:
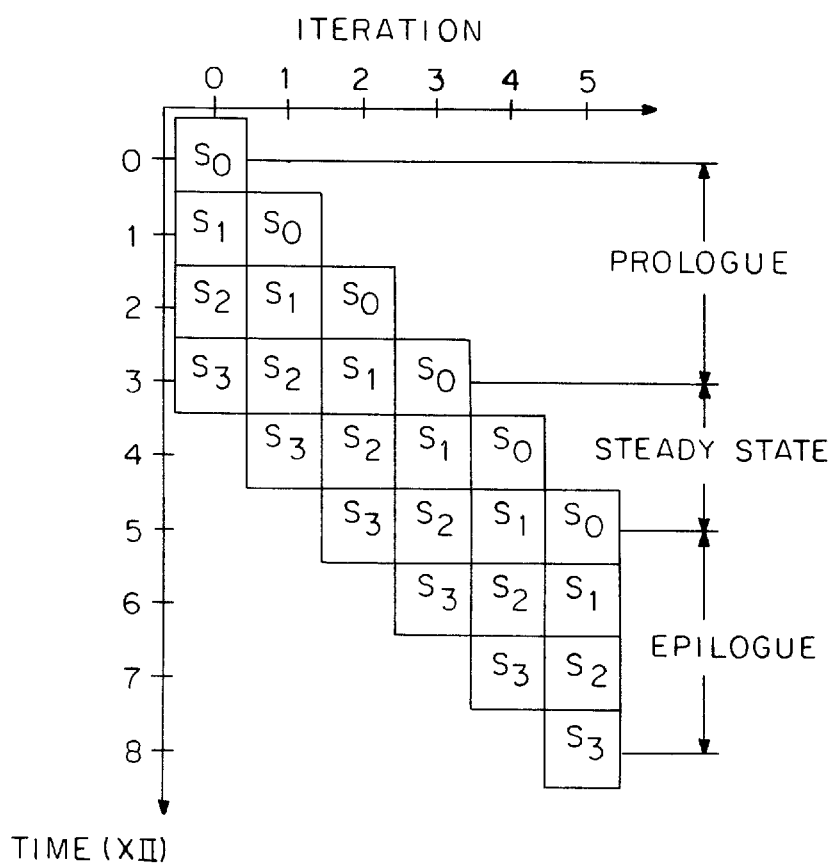
FIG. 1 is an outline of stage divisions in SWPL.
FIG. 2 is a schematic diagram illustrating the outline of operations of SWPL.
Figure 3:
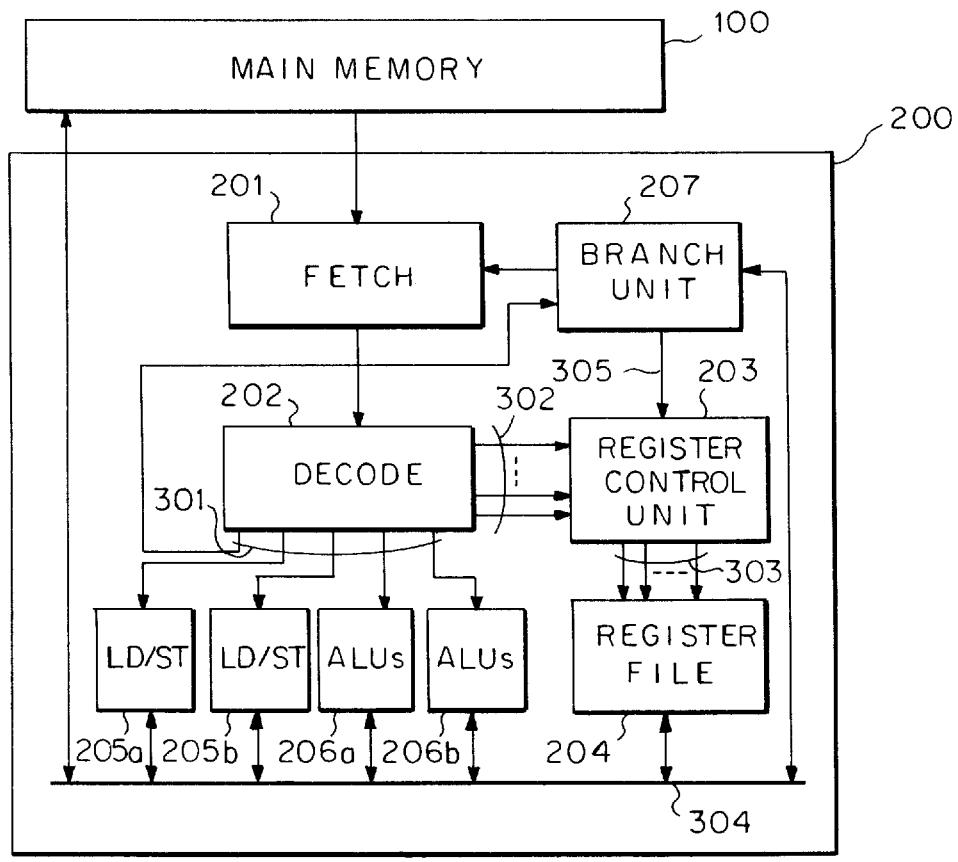
FIG. 3 is a schematic diagram illustrating a configuration of a processor of the present invention.

A system illustrated in FIG. 3 includes a memory 100, which may include a cache, and a processor 200 connected to the memory 100 that performs an instruction level parallel processing. In this processor, a fetch unit 201 fetches instructions specified by a program counter from the memory, and a decode unit 202 decodes one instruction after another and issues instructions through signal lines 301 to ALUs 206a, 206b, Load/Store (LD/ST) units 205a, 205b and a branch unit 207. At the same time, the information decoded by the decode stage is transferred through signal lines 302 to a register control unit 203, which generates physical register numbers to be used by the 206a and b ALUs and LD/ST 205 a and b units and supplies them to a register file 204 through signal lines 303.

The ALUs 206a and b access, through a common bus 304, registers in the register file specified by the physical register of the number generated by the register control unit 203 based according to logical register number specified by the instruction, and at the same time performs operations specified by an opcode of the instruction.

When the opcode of the instruction directs that data be moved on the memory 100 to a physical register of the register file 204 at the number generated by the register control unit 203 according to the logical register number specified by the instruction for use in calculation, the LD/ST unit reads data on the memory at an address generated by the operand in the instruction and writes the data into the register. When the opcode of the instruction directs that data produced by calculation is to be written back to the memory, the LD/ST unit 205a, b reads data from the register 204 and writes it into the address in the memory 100 specified by the operand.

The branch unit 207 checks if a branch condition specified by a branch instruction is met and, if so, sets the program counter to fetch the next instruction from an address specified by the instruction. The branch unit 207 may send to the register control unit 203 through a signal line 305 a signal for invalidating the buffer in the register control unit 203.

Figure 4:
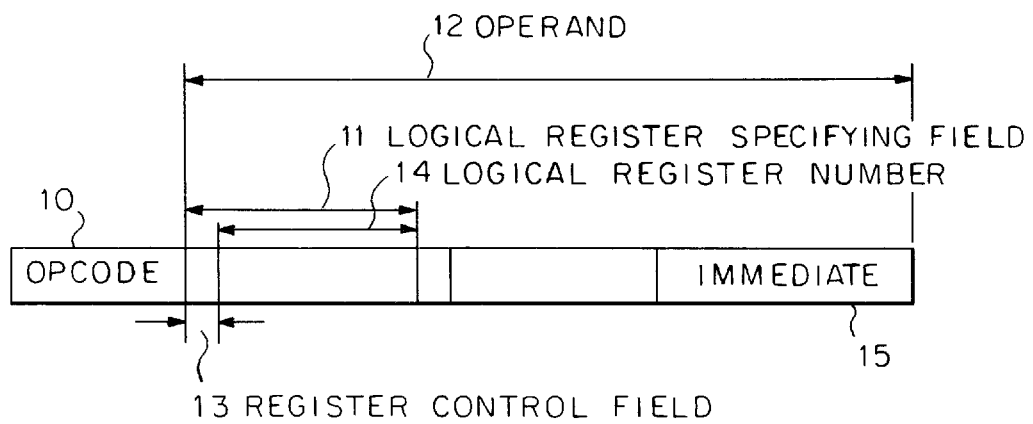
FIG. 4 is a diagram illustrating an instruction format of the processor of the present invention.

FIG. 4 illustrates an instruction format used by the processor 200. An instruction includes an opcode 10 and an operand 12. The operand can be used for specifying a logical register 11 or an immediate 15. When the logical register is specified, its field includes a logical register number 14 and a register control field 13. FIG. 4 represents an example of an operand which comprises two logical register specifying fields and one immediate.

Figure 5:
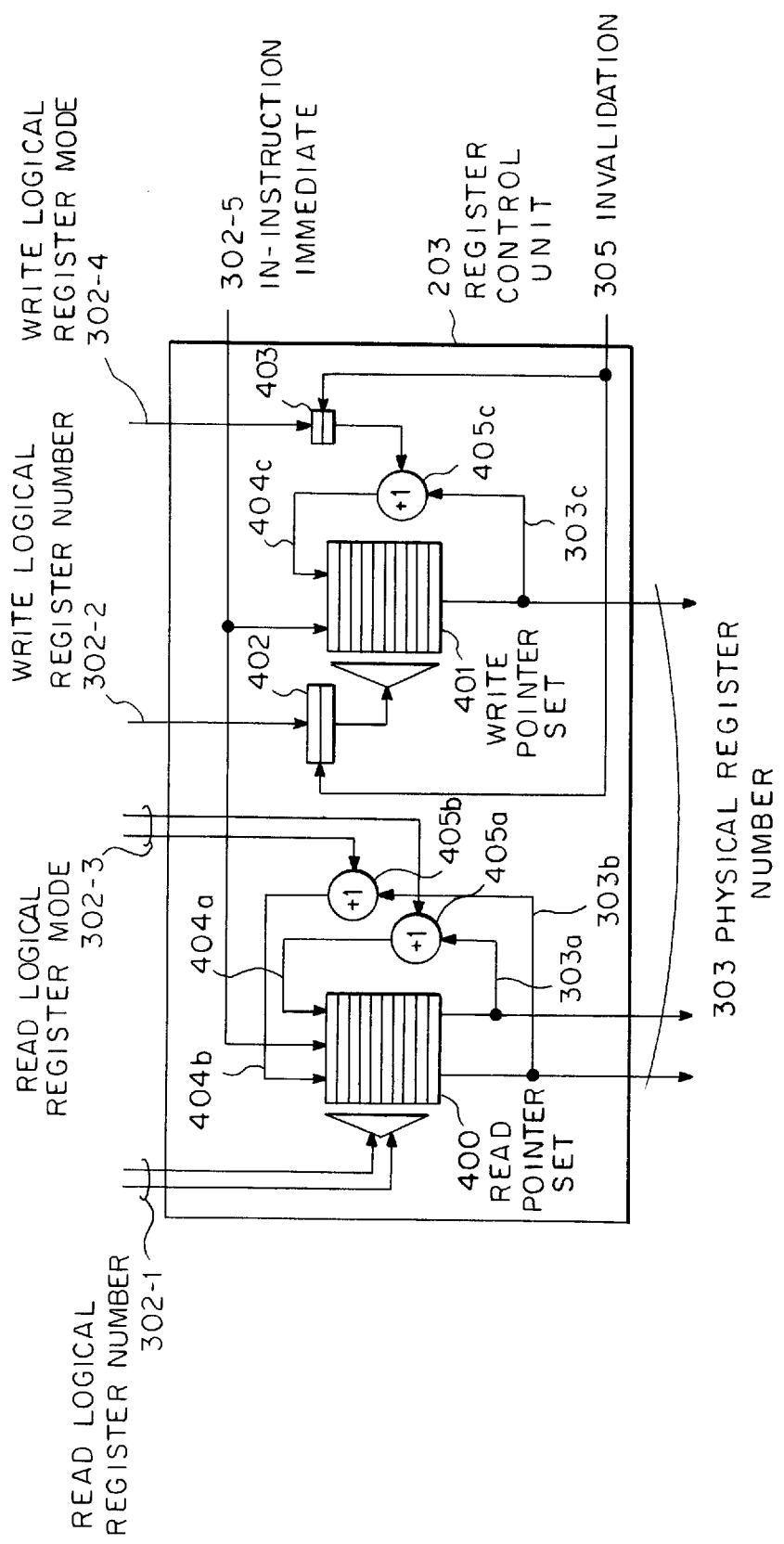
FIG. 5 is a diagram illustrating a first configuration of a register control unit of the present invention.

In response to the above instruction supplied from the fetch stage of the fetch unit 201, the decode unit 202 in its decode stage identifies the kind of access to the register specified by each logical register specifying field of the operand and then transfers the logical register number contained in the logical register specifying field to the register control unit 203 either as an input to a read logical register number 302-1 or as an input to a write logical register number 302-2, shown in FIG. 5. Likewise, the decode unit 202 also outputs the value of the register control field in the logical register specifying field to the register control unit either as an input to a read logical register mode 302-3 or as an input to a write logical register mode 302-4, depending on the kind of access.

At the decode stage, however, if the instruction sent from the fetch stage, which in this embodiment has in the operand field one logical register specifying field and an immediate field, is the one to set a pointer in the register control unit, the decode unit outputs the logical register number specified by the instruction both to the read logical register number and to the write logical register number and also outputs the immediate specified by the instruction to an immediate 302-5 in an instruction of the register control unit.

The register control unit 203 of FIG. 5 has a set of read pointers 400 and a set of write pointers 401 for the logical registers. When the instruction is other than the pointer setting instruction, the register control unit 203 uses as indices the read logical register number and the write logical register number sent from the decode stage through 302-1 and 302-2, reads from the sets of the read pointers and the write pointers a read pointer and a write pointer corresponding to the logical register numbers, and then outputs the read values as physical register numbers to the register file 204 through 303. The read pointer thus accessed controls adders 405a, 405b according to the value 1 or 0 of the read logical register mode given by 302-3 to increment or not increment the value of the read pointer and write it back through 404a and 404b to the same read pointer that has been read out.

As for the write pointer, because it is after the execution of the instruction to specify the logical register number that the value of the write pointer read by the write logical register number 302-2 transferred from the decode stage to the register control unit is output to the register file, the write logical register number and the write logical register mode are put in a buffer 402 and a buffer 403, respectively, in the register control unit and delayed an appropriate number of cycles. Then a write pointer corresponding to the logical register number is read and output to the register file.

As to the mode of the write logical register, when its value is 1, the mode controls an adder 405c to increment the write pointer that has been read out, and writes the incremented value back to the same write pointer through 404c. When its value is 0, the write logical register mode does not perform incrementing or write-back. However, after the write logical register number has been sent in from the decode stage until the corresponding write pointer is output to the register file, i.e., while the write logical register number and mode are buffered in 402 and 403, if a branch occurs whose direction differs from a predicted branch direction, a signal representing a prediction failure is sent from the branch unit through an invalidation 305 to the register control unit to invalidate the logical register number and mode buffered in 402 and 403.

Setting values in the read pointer and writer pointer is done by executing a pointer setting instruction. The pointer setting instruction has in an operand a logical register number and an immediate representing the value to be set. The decode stage supplies this logical register number to the register control unit as a read logical register number and as a write logical register number. The register control unit sets in a write enable state the read pointer and write pointer corresponding to the specified logical register numbers in the sets of read pointers and write pointers, and writes the data given by the immediate in the instruction to both of the pointers. Hence, the read pointer and the write pointer of the logical register specified by the pointer setting instruction have the value of the immediate specified by the same instruction.

FIG. 5 illustrates the register control unit as operating with respect o a single instruction. However, the register control unit could be expanded to handle multiple instructions by providing multiple lines with respect to the read and write pointers.

While in the following description, this embodiment is assumed to use the pointer setting instruction mentioned above, the following variation is also possible.

The pointer setting instruction may specify, with the opcode or operand, that the value setting is to be made on one of the read pointer and write pointer to set a value in only the specified pointer. This variation has the same configuration of FIG. 5 and can be realized by the decode stage outputting the logical register number specified by the instruction to one of the read logical register number and the write logical register number and by the register control unit setting in a write enable state the pointer corresponding to the specified logical register number and then storing the immediate specified by the instruction into the pointer.

For write into the logical register, the above operation of the register control unit ensures that contiguous physical registers are used if the register control field is set to 1, so that SWPL can perform the write into the register in the subsequent iteration before the read from the register in the current iteration. For the read from the logical register, because the pointer setting operation described above makes the initial value of the read pointer equal to the initial value of the write pointer and because contiguous physical registers are read out successively by the instruction whose register control field is 1, it is possible to read the physical registers in the same order of the execution of the write instructions has been executed.

In the following, detailed descriptions will be given to the software-pipelined program and its operation using the above register configuration by taking some examples. The program used is a Fortran program illustrated in FIG. 7. FIG. 9 illustrates the description of the program in an assembly language of a virtual processor.

Of the virtual processor's instructions, MTSPR instructions of numbers (1) to (4) of FIG. 9 are the pointer setting instructions mentioned above. The instruction of number (1), for example, sets 0 in both the read pointer and the write pointer for a logical register 0. Here, each instruction uses q or n for the logical register specification. This corresponds to the mode of each logical register, q specifying increment of the pointer and n specifying not performing increment of the pointer.

LDF instructions of numbers (5), (6) and (7) of FIG. 9 are the ones to read data at an address of the memory given by the second operand and write the data in a logical register specified by the first operand. On other hand, STF instructions of numbers (9) and (12) are the ones to read data from a logical register specified by the first operand and write the data into an address of the memory given by the second operand. These LDF and STF instructions increase the value of a register holding the address of the operand by a specified address after execution of the instructions. FDAA instructions of numbers (8) and (11) are the ones to read values of logical registers specified by the second and third operands, adding them, and write the added value into a logical register specified by the first operand. An FMUL instruction of number (10) is the one to read values in logical registers specified by the second and third operands, multiply the two values and write the multiplied value into a logical register specified by the first operand.

Figure 11:
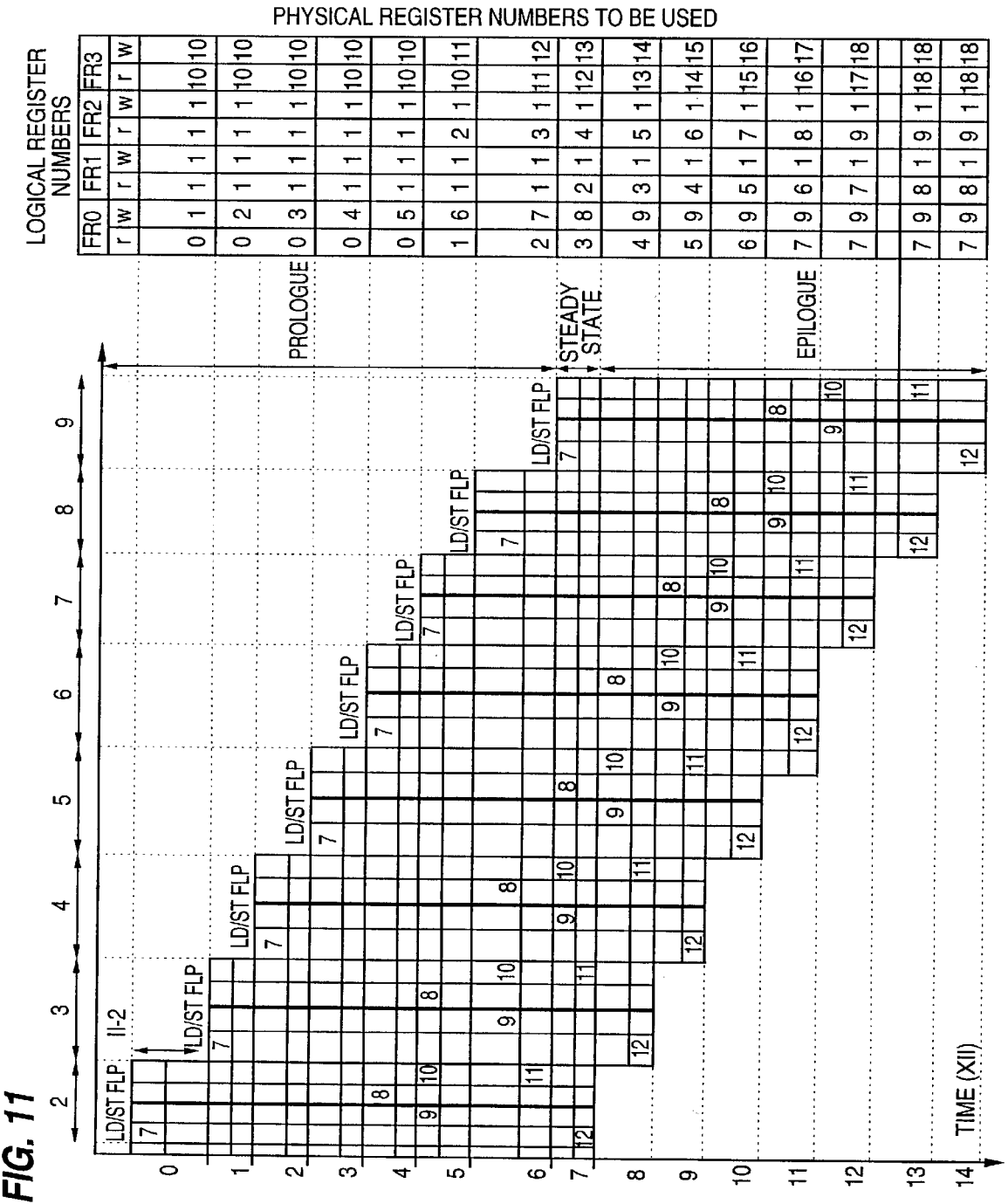
FIG. 11 is an example of the execution of the program in assembly language of FIG. 9 by the virtual processor.

FIG. 11 illustrates an example of an operation of an assembly language of the processor (processor of this invention) illustrated in FIG. 9. FIG. 11 illustrates the execution of instructions assuming that the virtual processor's load latency of 8, the calculation latency of 2, an LD/ST unit and two (floating point) ALUs, and the loop length of 8. On the left side of FIG. 11, the abscissa represents iterations and ordinate represents time. The numbers indicating the instructions in a loop shown in FIG. 9 are arranged in boxes representing iterations in such a way that the above latency conditions are satisfied. The table on the right of FIG. 11 illustrates logical register numbers (FR0, FR1, FR2, FR3) related to U(K), U(K−1) of FIG. 7 and the transition of read pointer and write pointer values.

As shown in FIG. 11, this system performs the write into the same logical register in the subsequent iteration before the read in the current iteration. For example, the instruction (7) with K=3, 4, 5, 6 is executed prior to the instruction (8) with K=2. The fact that the pointer setting for each register made before the loop causes a physical register which has been written into by a logical register number to be read out by a different logical register number is reflected on the relation between the FR0 and FR1, FR2. This obviates the need for redundant copy instructions in the loop.

Here, descriptions of the same program in the assembly language when applied to a virtual processor having a register configuration of the first conventional technique are illustrated in FIG. 10. It is noted that q/n in the logical register specifying field is the same as shown in FIG. 9. FMOV instructions of numbers (4), (6), (8) are the ones to read the value from a logical register specified by the second operand and writing the value into a logical register specified by the first operand.

Figure 12:
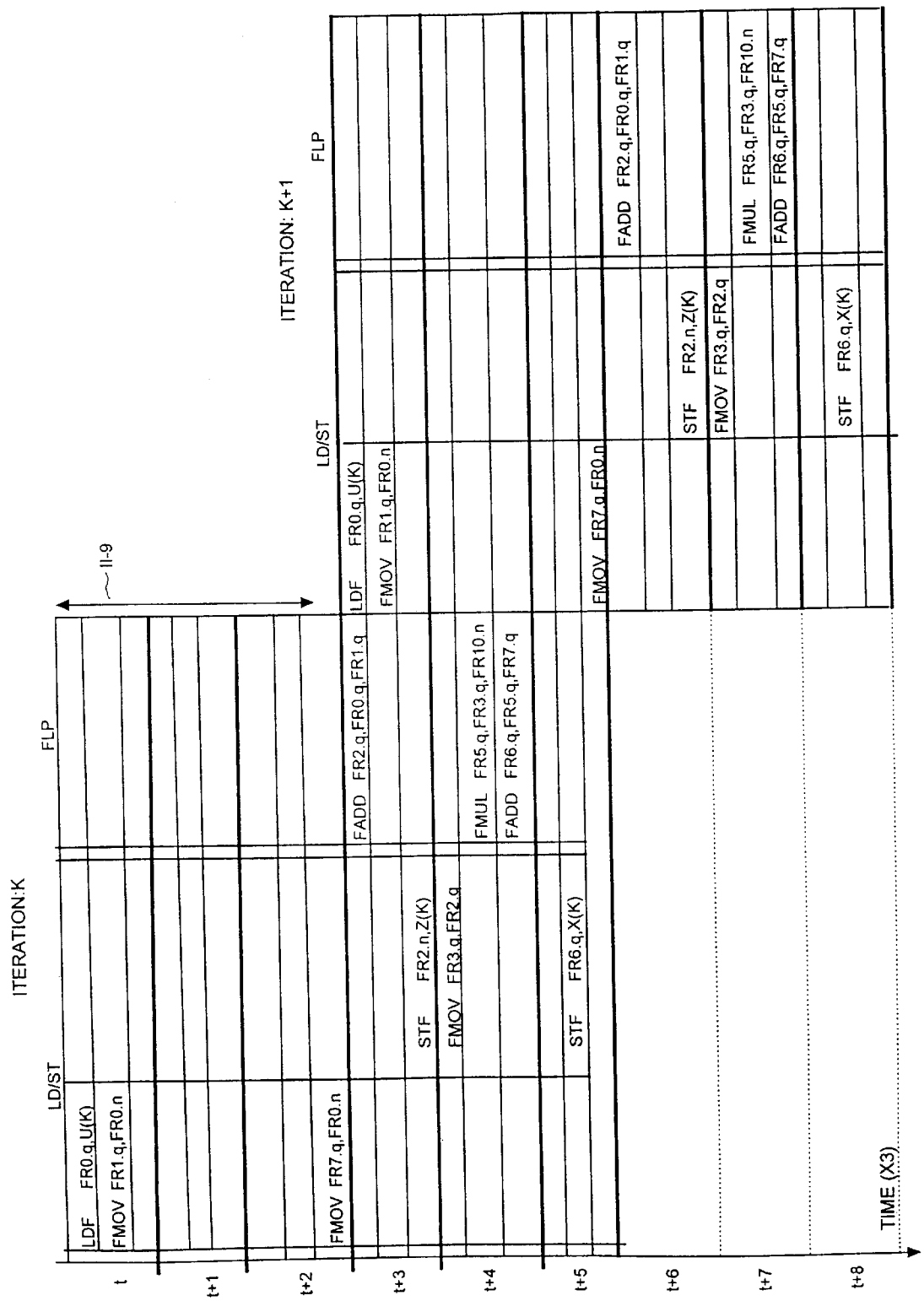
FIG. 12 is an example of the execution of FIG. 10 by the virtual processor.

When SWPL is performed on this instruction sequence, the instruction execution is as illustrated in FIG. 12. It is noted that FIG. 12 does not show the instruction field for the ALUs not used. As can be seen from FIG. 12, insertion of additional copy instructions (4), (6), (8) increases the number of instruction codes in the loop. Further, because the read pointer of FR0 is not updated until after the instruction FADD FR2. q, FR0. q, FR1. q at iteration K, the instruction FMOV FR1, q, FR0. n at iteration K+1 cannot be executed. As a result, the initiation interval increases to 9, degrading the performance.

Now, referring to FIG. 11, the execution of instructions will be detailed for each time.

From time 0 to time 3, an instruction (7) is executed. Because FR0 of the instruction (7) specifies q, the program reads U(2) to U(5) from the memory and increments the write pointer of the logical register FR0 successively. Hence, the physical registers 1 to 4 are written into successively in this order.

At time 4, an instruction (8) with K=2 and an instruction (7) with K=6 are executed. The instruction (7) stores the value of U(6) from memory into the write physical register 5 specified by the write pointer of the logical register FR0. Because the instruction contains q specification, the write pointer is incremented. As for the instruction (8), because the read pointers of the logical registers FR0 and FR2 are set at 0 and 1 according to instructions (1) and (3), respectively, the program reads the values of U(1) and U(2) from the physical registers 0 and 1, sums them up to generate a value of Z(2) and writes it into the write physical register 10 indicated by the write pointer of the logical register FR3. Further, because the logical registers are all q-specified, their pointers are incremented.

At time 5, instructions (9), (10) with K=2, an instruction (8) with K=3, and an instruction (7) with K=7 are executed. As to the instruction (7) and instruction (8), the execution is similar to that of time 4. The instruction (7) stores the value of U(7) from the memory into the physical register 6 and updates the write pointer. The instruction (8) reads the values of U(2) and U(3) from the physical registers 1 and 2, sums them up, stores the value of Z(3) into the physical register 11, and increments the pointers. The instruction (9) writes back to the address of Z(2) on the memory the value of Z(2) held in the physical register 10 specified by the read pointer of the logical register FR2. Because the instruction has n specification, the read pointer of the logical register FR2 is not incremented. As for the instruction (10), because the logical register FR10 stores the value of a scalar variable R, the program calculates the product of FR10 and the value of Z(2) held in the physical register 10 indicated by the read pointer of the logical register FR3 and writes the calculation result into a physical register specified by the write pointer of FR5. Because FR3 and FR5 are q-specified, the read pointer of FR3 and the write pointer of FR5 are incremented. Here, it is necessary to make setting to ensure that the logical register FR10 uses physical registers not used by other logical registers so that its contents is not changed by definition to other logical registers. This is realized, in the case of the program of FIG. 7, by setting the read pointer of FR10 at a value equal to or greater than the sum of the maximum value out of the initial values of the logical registers used in the loop for writing and the loop length because the loop length is known to be 8.

At time 6, an instruction (11) with K=2, instructions (9), (10) with K=3, an instruction (8) with K=4 and an instruction (7) with K=8 are executed. As for the instructions (7) and (8), the execution is similar to that of time 4. The instruction stores U(7) from memory into the physical register 7 and updates the write pointer. The instruction (8) reads values of U(3) and U(4) from the physical registers 2 and 3, sums them up, stores the value of Z(4) into the physical register 12, and increments the pointers. As to the instructions (9) and (10), the program execution is similar to that at time 5. The instruction (9) writes back the value of Z(3) held in the physical register 11 to the address of Z(3) on the memory, and the instruction (10) calculates the product of Z(3) held in the physical register 11 and the scalar variable R of FR10, stores the calculation result in a physical register specified by the write pointer of FR5, and increments the pointers. The instruction (11) adds up the value, which has been written into the physical register specified by the write pointer of FR10 during the execution of the instruction (10) at time 5, and the contents of the physical register 1 specified by the read pointer of FR1, and then stores the calculated value in a physical register specified by the write pointer of FR6. The instruction (11) also increments the pointers.

At time 7 an instruction (12) with K=2, an instruction (11) with K=3, instructions (9) and (10) with K=4, an instruction (8) with K=5, and an instruction (7) with K=9 are executed. The execution of the instructions (7) and (8) is similar to that performed at time 4. The instruction (7) stores U(8) from memory into the physical register 8 and updates the write pointer. The instruction (8) reads the values of U(4) and U(5) from the physical registers 3 and 4, adds them up, stores the value of Z(5) into the physical register 13, and increments the pointers. The execution of the instructions (9) and (10) is similar to that performed at time 5. The instruction (9) writes back the value of Z(4) held in the physical register 12 to the address of Z(3) on the memory; the instruction (10) calculates the product of Z(4) held in the physical register 12 and the scalar variable R of FR10, stores the product into a physical register specified by the write pointer of FR5, and increments the pointers. The instruction (11) adds up the value, which has been written into the physical register specified by the write pointer of FR5 during the execution of the instruction (10) at time 6, and the contents of the physical register 2, stores the calculation result into a physical register specified by the write pointer of FR6, and increments the pointers. The instruction (12) reads a value from the physical register specified by the write pointer of FR6 during the execution of the instruction (11) at time 6, writes it back to the address of X(2) on the memory, and increments the read pointer of FR6.

At times 8, 9, 10 and 11, an instruction (12) with K=3, 4, 5, 6, an instruction (11) with K=4, 5, 6, 7, instructions (9) and (10) with K=5, 6, 7, 8 and an instruction (8) with K=6, 7, 8, 9 are executed. The instructions (7) and (8) are executed in the same way at time 4. The instruction (8) at these times read the values of U(5) and U(6), U(6) and U(7), U(7) and U(8), U(8) and U(9) from the physical registers 4 and 5, 5 and 6, 6 and 7, 7 and 8, adds them up respectively, and stores the values of Z(6), Z(7), Z(8), Z(9) into the physical registers 14, 15, 16, 17. The execution of the instructions (9) and (10) is similar to that at time 5. The instruction (9) writes back the values of Z(5), Z(6), Z(7), Z(8) held in the physical registers 13, 14, 15, 16 to the corresponding addresses on the memory. The instruction (10) calculates products of Z(5), Z(6), Z(7), Z(8) held in the physical registers 13, 14, 15, 16 and the scalar variable R of FR10, and stores the calculation results into a physical register specified by the write pointer of FR5. The instruction (11) at time 7, 8, 9, 10 adds up the value, which has been written into the physical register specified by the write pointer of FR5 during the execution of the instruction (10), and the contents of the physical registers 3, 4, 5, 6, and then successively stores the calculated values into the physical registers specified by the write pointer of FR6. The instruction (12) reads a value from the physical register specified by the write pointer of FR6 at a time prior to the execution of the instruction (12), and writes it back to the addresses of X(3), X(4), X(5), X(6) on the memory.

At time 12, an instruction (12) with K=7, an instruction (11) with K=8, instructions (9) and (10) with K=9 are executed. The execution of instructions (9) and (10) is carried out in a similar manner to that at time 5. The instruction (9) writes back the value of Z(9) held in the physical register 17 to the corresponding address on the memory; the instruction (10) calculates the product of Z(9) held in the physical register 17 and the scalar variable R of FR10 and then stores the calculated product into the physical register specified by the write pointer of FR5. The instruction (11) sums up the value, that has been written into the physical register specified by the write pointer of FR5 during the execution of the instruction (10) at time 11, and the contents of the physical register 7 and then stores the calculated value into the physical register specified by the write pointer of FR6. The instruction (12) reads a value from the physical register specified by the write pointer of FR6 at a time prior to the execution of the instruction (12), and writes it back to the address of X(7) on the memory.

At time 13, an instruction (12) with K=8 and an instruction (11) with K=9 are executed. The instruction (11) adds up the value, that has been written into the physical register specified by the write pointer of FR5 during the execution of the instruction (10) at time 12, and the contents of the physical register 8 and then stores the calculated value into a physical register specified by the write pointer of FR6. The instruction (12) reads the value from the physical register specified by the write pointer of FR6 before the execution of the instruction, and writes it back to the address of X(8) on the memory.

At time 14, an instruction (12) with K=9 is executed. The instruction (12) reads the value from the physical register specified by the write pointer of FR6 at a time prior to the execution of the instruction, and writes it back to the address of X(9) on the memory.

Embodiment 2

Figure 8:
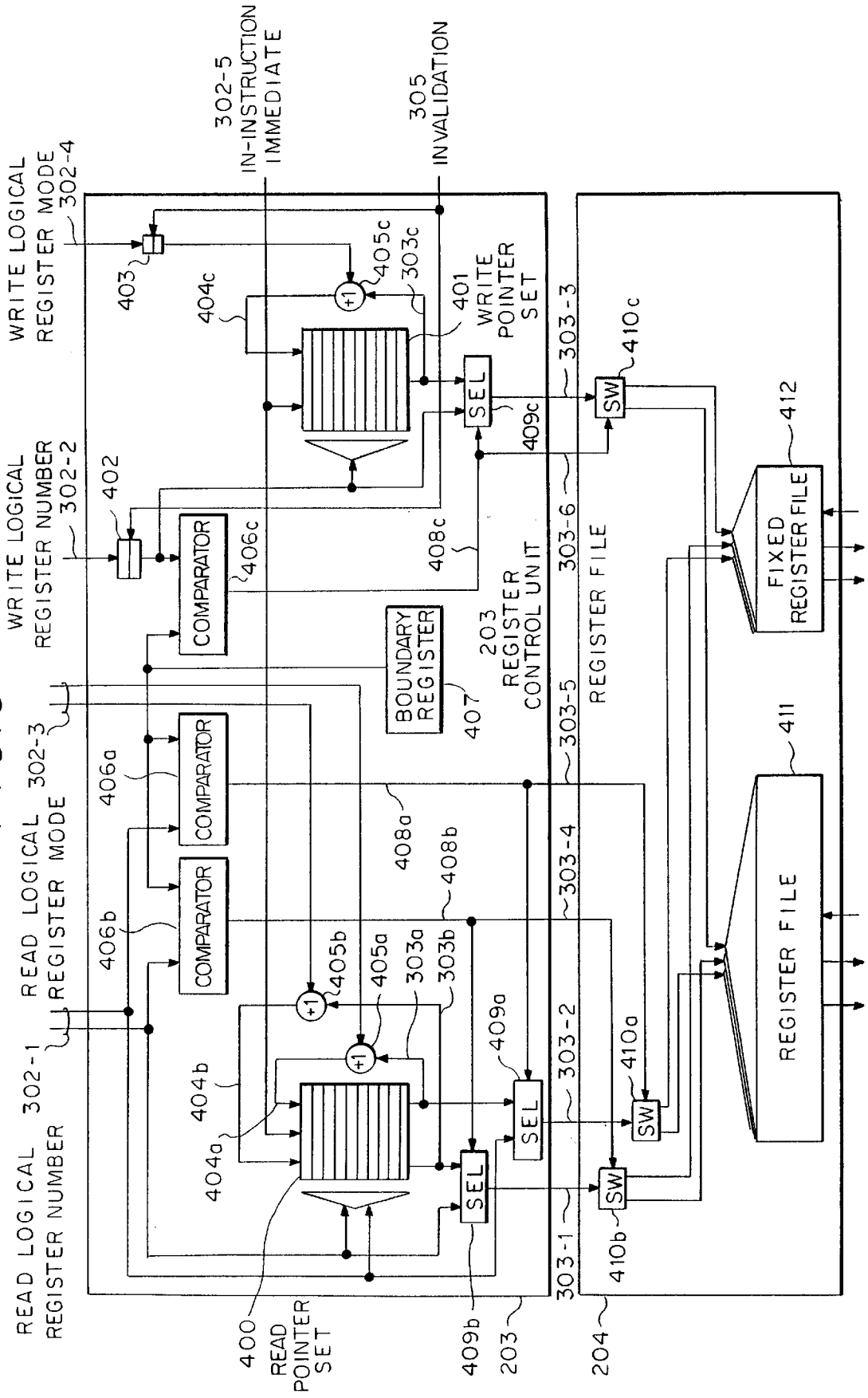
FIG. 8 is a diagram illustrating a third configuration of the register control unit of the present invention.

This embodiment is a variation of Embodiment 1 and has the register control unit 203 and the register file 204 configured as illustrated in FIG. 8. In addition to the register file 411 used in Embodiment 1 for accessing physical registers through read/write pointers based on the logical register numbers, this embodiment also has a fixed register file 412 that is not destroyed by other logical register numbers and which has a one-to-one correspondence between the logical register numbers and the physical register numbers. The use of a register (referred to as a fixed register) in the fixed register file for the constants in the loop such as R in the codes shown in FIG. 7 of Embodiment 1 alleviates the physical register management performed by the compiler.

In this embodiment, the fixed register numbers are contiguous and smaller than a predetermined number. The register file has a separate register file dedicated for the fixed register numbers to distinguish it from other register files. As another variation of this embodiment, it is conceivable to use a part of the register file as the fixed register file. But this will not be described here.

In FIG. 8 showing the configuration of the register control unit of this embodiment, constitutional elements operate in a similar manner to those of Embodiment 1 of FIG. 5 that have the same reference numbers. Thus, we will explain about only those parts that are different from Embodiment 1. The read logical register number and the write logical register number sent from the decode stage through 302-1, 302-2 are compared by comparators 406a, 406b, 406c with a boundary register 407 holding the maximum value of the fixed register numbers plus 1. If the logical register specifying field has a value greater than the value of the boundary register, the register is not a fixed register. So, selectors 409a, 409b 409c are controlled by the outputs of the comparators 406a, 406b, 406c to read a read pointer and a write pointer from the set of read pointers and the set of write pointers by using the values of 301-1, 2 as indices and to output them as the physical register numbers to the register file 204 through 303-1 or 303-2 or 303-3, as in Embodiment 1. At this time, the results of the comparators 406a, 406b, 406c are also output to the register file through 303-4, 303-5, 303-6. Based on the comparison results from 303-4, 303-5, 303-6 the register file decides by switches 410a, b, c whether to send 303-1, 2, 3 to the fixed register file 412 or to the register file 411. The buffer 402 is provided before the comparator 406c for the same reason of Embodiment 1.

If the logical register specifying field specifies a value smaller than the boundary register, the selector 409a, 409b, or 409c corresponding to the field is controlled to output the read logical register number or write logical register number sent from the decode stage to the register file 204 so as to access the fixed register. At the same time, the results of the comparators 406a, 406b, 406c are also output to the register file 204. Based on the comparison results, the switches 410a, 410b, 410c are controlled to send the logical register number in the logical register specifying field to the fixed register file 412.

With the above processing, when the logical register specifying field of an instruction has a logical register number smaller than the value held in the boundary register, the fixed register file is accessed to retrieve a value as a physical register number corresponding to the logical register number, when on the other hand the field specifies a value greater than the boundary register value, the queue register file is accessed and data is transferred among the ALU, LD/ST unit, and branch unit.

Embodiment 3

Figures 6, 7:
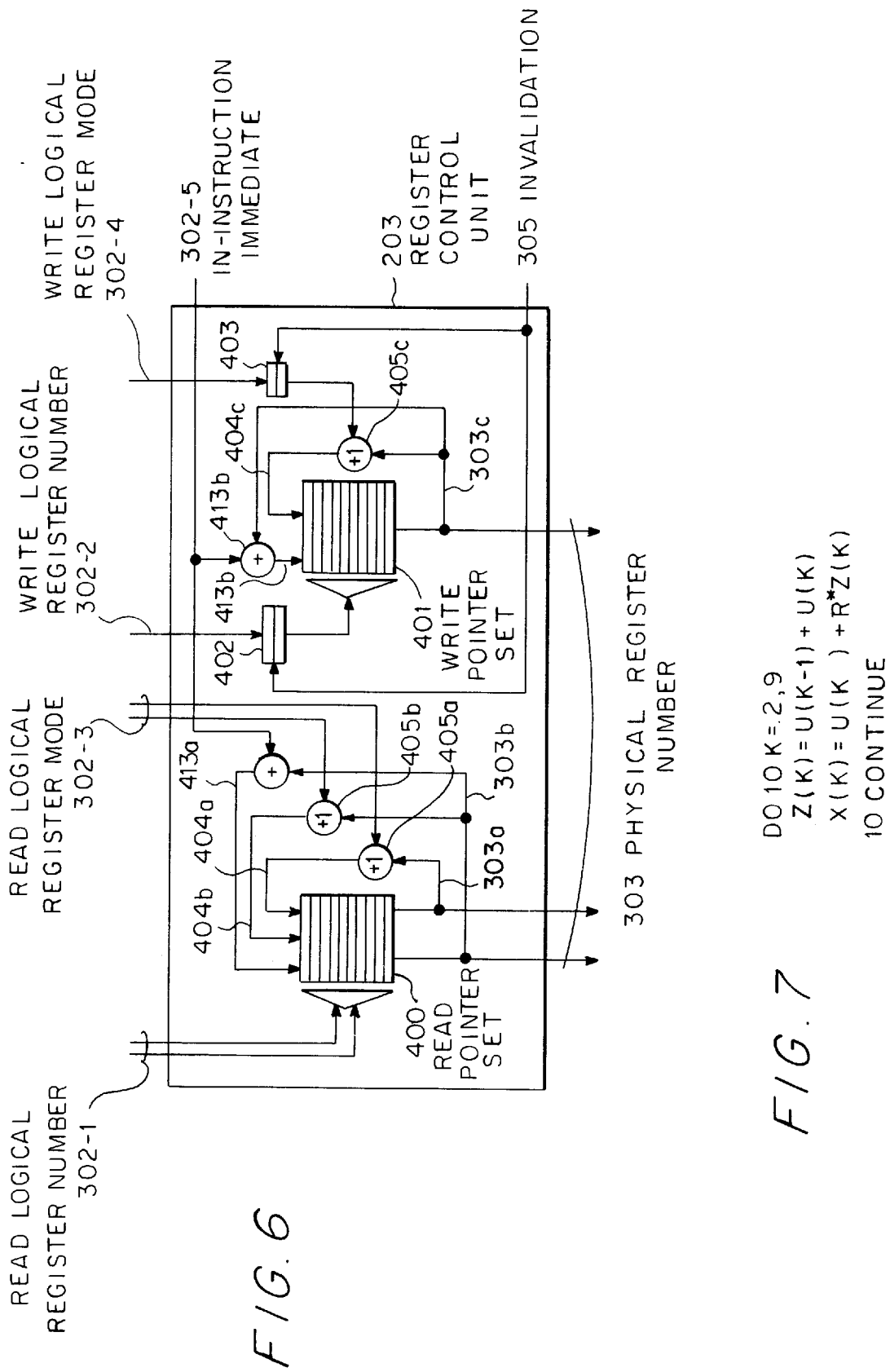
FIG. 6 is a diagram illustrating a second configuration of the register control unit of the present invention.
FIG. 7 is a diagram illustrating an example of a Fortran program to be executed by the processor of FIG. 3.

This embodiment is a variation of Embodiment 1 and sets the pointer for a first logical register number by referencing the pointer for a second logical register number specified by an instruction and adding an immediate specified by the instruction to the pointer of the second logical register number. The only problem in applying this method is the distance between the logical registers. This embodiment is used for applications where the positions in the register file of the physical registers used by the logical registers do not matter. The configuration of the register control unit of this embodiment is shown in FIG. 6.

While the similar variation can also be applied to Embodiment 2 to produce similar effects, this embodiment has only the configuration based on Embodiment 1. The constitutional elements with like reference numbers in FIG. 6 illustrating the configuration of this embodiment and in FIG. 5 illustrating Embodiment 1 perform in similar way. In this embodiment, therefore, only parts that differ from those of Embodiment 1 will be described.

In the configuration of this embodiment, exactly the same operations of Embodiment 1 are performed except for the pointer setting instruction. That is, only the pointer setting instruction produces operations different from those of Embodiment 1. The pointer setting instruction of this embodiment has an operand for specifying two logical register specifying fields and one immediate field, and an opcode to select the kind of a pointer to be specified. In the selected kind of pointers, i.e., a set of read pointers 400 or a set of write pointers 401, a pointer is write-enabled based on the logical register number in the first logical register specifying field as an index. A pointer in the selected set of pointers is read out based on a logical register number in the second logical register specifying field as an index; the value in the immediate field of the instruction is received from the decode stage through 302-5; and the value of the pointer read out and the value of the immediate are summed up by an adder 413a or 413b and written back to the write-enabled pointer.

Embodiment 4

Figure 13:
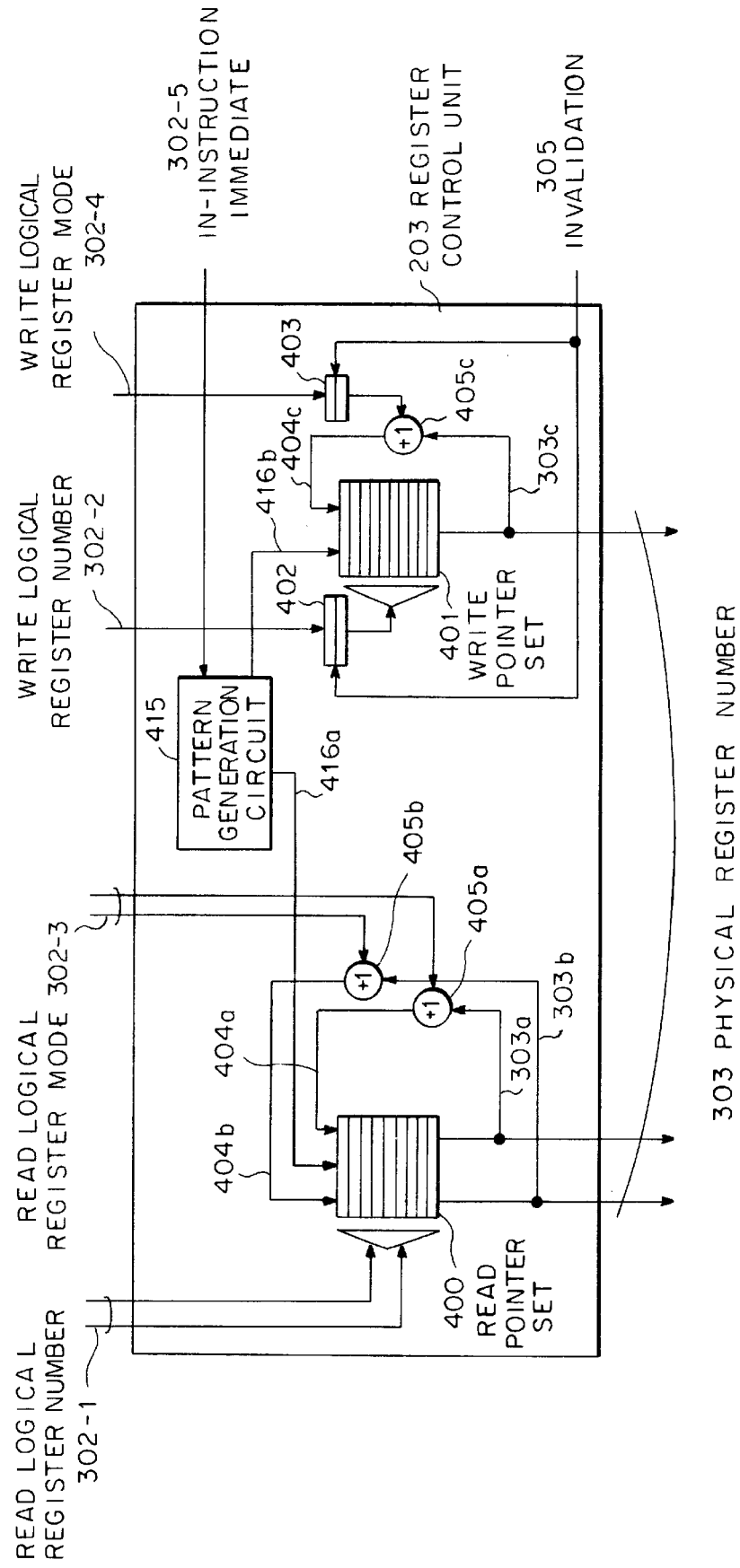
FIG. 13 is a diagram illustrating a fourth configuration of the register control unit of the present invention.

This embodiment is a variation of Embodiment 1 and is characterized in that a predetermined pattern of initial value is provided for each pointer and that when a pointer setting instruction is executed, the contents of each pointer become that pattern. In Embodiment 1, because it is necessary to execute a pointer setting instruction associated with the logical register used in the software-pipelined loop, a loop starting overhead is produced. On the other hand, the pointer setting method of this embodiment allocates registers so that the compiler can use logical register numbers that are appropriately distant from one another. The overhead can therefore be reduced. FIG. 13 illustrates an example of a configuration of the register control unit of this embodiment. Because the constitutional elements with like reference numbers in FIG. 13 of this embodiment and in FIG. 5 of Embodiment 1 perform similar operations, only the parts of this embodiment that differ from Embodiment 1 will be explained.

In the configuration of this embodiment, the operations are exactly the same as those of Embodiment 1, except that the operation relating to the pointer setting instruction is different. The pointer setting instruction of this embodiment does not have a logical register specifying field. Only the immediate specifying field is included in the operand. The value of the immediate specifying field is fed from the decode stage into the register control unit through 302-5. The 302-5 is used in the pattern generation circuit 415 in the register control unit to select a pattern for the pointer to be set in the read pointer set 400 and the write pointer set 401. The values generated by the pattern generation circuit are stored in pointers in the read pointer set and the write pointer set through 416a, 416b.

An example of a function that may be incorporated in the pattern generation circuit includes left-shifting the contents of a pointer for each logical register number by the number of bits equal to the logarithm of the quotient of division of the number of physical registers by the number of logical registers so that the physical registers used by the logical registers are distributed at equal intervals in the register file. Another function is the one to have initial values in the pattern generation circuit beforehand and to make a copy to the read pointer set and the write pointer set according to the pointer setting instruction.

In this invention, the read pointers and the write pointers that can specify all the physical registers are provided for the logical registers, and each time an instruction makes a register access, the pointer is used as a physical register number. The pointer used for accessing the physical register is incremented if so specified in an instruction so that for subsequent accesses of the same kind to the same logical register number, different physical registers can be used. This offers the advantage of preventing the degradation of instruction level parallelism that would otherwise occur when the write and read operations on the same logical register in the SWPL are sequenced to guarantee their intended order of execution. Further, because switching among physical registers is performed each time an instruction that requests such switching is executed, the execution of additional instructions for changing physical registers as required in the conventional register renaming can be obviated.

Further, because physical register access does not directly use the register specifying field, it is possible to handle a large capacity physical register file even if the register specifying field in the instruction is small.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A processor for processing instructions each including at least a logical register number which specifies a logical register, comprising:

a register file having a plurality of physical registers corresponding to a plurality of physical register numbers;

a converter which converts logical register numbers included in instructions to be executed into physical register numbers;

a first circuit, responsive to said instructions, which writes to different physical registers successively as specified by physical register numbers from said converter, when said instructions are write instructions; and a second circuit, responsive to said instructions, which reads from arbitrary locations the contents of physical registers as specified by physical register numbers from said converter according to an order the physical registers are written into by said write instructions, when said instructions are read instructions.

2. A processor according to claim 1, wherein said converter comprises:

read pointers and write pointers specifying said physical registers;

a third circuit which reads a read pointer or a write pointer from said read pointers and write pointers according to said logical register number in said instruction to be executed, said instruction to be executed having a register control field, said register control field controlling the logical register number and the pointer corresponding to the logical register number, and according to the kind of access to the logical register specified by the logical register number, the access kind being determined by an opcode, and accesses a physical register in said register file by using the contents of the pointer as a physical register number;

a fourth circuit, triggered by the execution of said instruction including the logical register field, which increments the value of the read pointer or write pointer according to the value of the register control field and writes back the incremented value to said read pointers and write pointers; and a fifth circuit which executes an instruction to set an arbitrary value in said read pointers and write pointers corresponding to the logical register number in the logical register field of said instruction.

3. A processor according to claim 1, wherein logical registers having a part of a logical register number are fixedly assigned to the same physical register.

4. A processor according to claim 2, further comprising:

a sixth circuit which executes a pointer setting instruction calling for setting the value of a read pointer and a write pointer referenced when making access to a logical register; and a seventh circuit which selects a read pointer and a write pointer according to the logical register number specified by the pointer setting instruction and sets an immediate specified by the pointer setting instruction into said read pointers and write pointers.

5. A processor according to claim 3, further comprising:

a sixth circuit which executes a pointer setting instruction calling for setting the value of a read pointer and a write pointer referenced when making access to a logical register; and a seventh circuit which selects a read pointer and a write pointer according to the logical register number specified by the pointer setting instruction and sets an immediate specified by the pointer setting instruction into said read pointers and write pointers.

6. A processor according to claim 2, further comprising:

a sixth circuit which executes a pointer setting instruction calling for setting the value of a read pointer and a write pointer referenced when making access to a logical register; and a seventh circuit which selects a read pointer and a write pointer according to a logical register number and opcode specified by the pointer setting instruction and sets an immediate specified by the pointer setting instruction into the selected pointer.

7. A processor according to claim 3, further comprising:

a sixth circuit which executes a pointer setting instruction calling for setting the value of a read pointer and a write pointer referenced when making access to a logical register; and a seventh circuit which selects a read pointer and a write pointer according to a logical register number and opcode specified by the pointer setting instruction and sets an immediate specified by the pointer setting instruction into the selected pointer.

8. A processor according to claim 2, further comprising:

a sixth circuit which executes a pointer setting instruction calling for setting the value of a read pointer and a write pointer referenced when making access to a logical register; and a seventh circuit which selects a read pointer and a write pointer according to a first logical register number and a second logical register number specified by the pointer setting instruction, adds an immediate specified by the pointer setting instruction representing a difference between said read pointer and said write pointer to said read pointers and write pointers corresponding to a second logical register number, and writes back a calculated value to said read pointers and write pointers corresponding to the first logical register number.

9. A processor according to claim 3, further comprising:

a sixth circuit which executes a pointer setting instruction calling for setting the value of a read pointer and a write pointer referenced when making access to a logical register; and a seventh circuit which selects a read pointer and a write pointer according to a first logical register number and a second logical register number specified by the pointer setting instruction, adds an immediate specified by the pointer setting instruction representing a difference between said read pointer and said write pointer to said read pointers and write pointers corresponding to a second logical register number, and writes back a calculated value to said read pointers and write pointers corresponding to the first logical register number.

10. A processor according to claim 2, further comprising:

a sixth circuit which executes a pointer setting instruction call for setting a value of a read pointer and a write pointer referenced when making access to a logical register; and a seventh circuit which selects a read pointer and a write pointer according to a first logical register number, a second logical register number and an opcode specified by the pointer setting instruction, adds an immediate specified by the pointer setting instruction representing a difference between said read pointer and said write pointer to the pointer corresponding to the second logical register number, and writes back the calculated value to the read pointer or write pointer corresponding to the first logical register number.

11. A processor according to claim 3, further comprising:

a sixth circuit which executes a pointer setting instruction calling for setting a value of a read pointer and a write pointer referenced when making access to a logical register; and a seventh circuit which selects a read pointer and a write pointer according to a first logical register number, a second logical register number and an opcode specified by the pointer setting instruction, adds an immediate specified by the pointer setting instruction representing a difference between said read pointer and said write pointer to the pointer corresponding to the second logical register number, and writes back the calculated value to the read pointer or write pointer corresponding to the first logical register number.

12. A processor according to claim 2, further comprising:

a sixth circuit which executes a pointer setting instruction calling for a setting a value of a read pointer and a write pointer referenced when making access to a logical register; and a seventh circuit which sets the read pointer and write pointer to a predetermined value as a result of execution of the pointer setting instruction.

13. A processor according to claim 3, further comprising:

a sixth circuit which executes a pointer setting instruction calling for setting a value of a read pointer and a write pointer referenced when making access to a logical register; and a seventh circuit which sets the read pointer and write pointer to a predetermined value as a result of execution of the pointer setting instruction.

14. A processor comprising:

a plurality of logical registers specified by logical register numbers;

a register file having a plurality of physical registers specified by physical register numbers;

a converter which converts the logical register numbers into arbitrary physical register numbers;

a first circuit, responsive to a write instruction, which accesses different physical registers successively when the write instruction for writing into a first logical register is executed a plurality of times; and a second circuit, responsive to a read instruction, which reads from arbitrary locations the contents of physical registers in the order the physical registers were written into by the write instruction for the first logical register when the read instruction for reading from the logical register is executed a plurality of times.

15. A processor according to claim 14, wherein said converter comprises:

read pointers and write pointers specifying said physical registers;

a third circuit which reads a read pointer or a write pointer from read pointers or write pointers according to the logical register number in an instruction having a register control field, said register control field controlling the logical register number and the pointer corresponding to the logical register number, and according to the kind of access to the logical register specified by the logical register number, said access kind being determined by an opcode, and accesses a physical register in the register file by using the contents of the pointer as a physical register number; and a fourth circuit, responsive to the execution of the instruction including the logical register field, which increments the value of the read pointer or write pointer according to the value of the register control field representing the logical register number and writes back the incremented value to the read pointer or write pointer in the read pointers or write pointers; and a fifth circuit which executes an instruction to set an arbitrary value in the read pointer and write pointer corresponding to the logical register number in the logical register field of the instruction.

16. A processor according to claim 14, wherein logical registers having a part of the logical register number of the logical register are fixedly assigned to the same physical register.

17. A processor according to claim 15, further comprising:

a sixth circuit which executes a pointer setting instruction calling for setting the value of a read pointer and a write pointer referenced when making access to the logical register; and a seventh circuit which selects a read pointer and a write pointer according to the logical register number specified by the pointer setting instruction and sets an immediate specified by the pointer setting instruction and representing a physical register number into the read pointer and write pointer.

18. A processor according to claim 16, further comprising:

a sixth circuit which executes a pointer setting instruction calling for setting the value of a read pointer and a write pointer referenced when making access to the logical register; and a seventh circuit which selects a read pointer and a write pointer according to the logical register number specified by the pointer setting instruction and sets an immediate specified by the pointer setting instruction and representing a physical register number into the read pointer and write pointer.

19. A processor according to claim 15, further comprising:

a sixth circuit which executes a pointer setting instruction calling for setting the value of a read pointer and a write pointer referenced when making access to the logical register; and a seventh circuit which selects a read pointer and a write pointer according to the logical register number and the opcode specified by the pointer setting instruction and sets an immediate specified by the pointer setting instruction and representing a physical register number into the selected pointer.

20. A processor according to claim 16, further comprising:

a sixth circuit which executes a pointer setting instruction calling for setting the value of a read pointer and a write pointer referenced when making access to the logical register; and a seventh circuit which selects a read pointer and a write pointer according to the logical register number and the opcode specified by the pointer setting instruction and sets an immediate specified by the pointer setting instruction and representing a physical register number into the selected pointer.

21. A processor according to claim 15, further comprising:

a sixth circuit which executes a pointer setting instruction calling for setting the value of a read pointer and a write pointer referenced when making access to the logical register; and a seventh circuit which selects a read pointer and a write pointer according to a first logical register number and a second logical register number specified by the pointer setting instruction, adds an immediate specified by the pointer setting instruction and representing the difference between the two pointers to the read pointer and write pointer corresponding to the second logical register number, and writes back the calculated value to the read pointer and write pointer corresponding to the first logical register number.

22. A processor according to claim 16, further comprising:
a sixth circuit which executes a pointer setting instruction calling for setting the value of a read pointer and a write pointer referenced when making access to the logical register; and
a seventh circuit which selects a read pointer and a write pointer according to a first logical register number and a second logical register number specified by the pointer setting instruction, adds an immediate specified by the pointer setting instruction and representing the difference between the two pointers to the read pointer and write pointer corresponding to the second logical register number, and writes back the calculated value to the read pointer and write pointer corresponding to the first logical register number.

23. A processor according to claim 15, further comprising:
a sixth circuit which executes a pointer setting instruction calling for setting the value of a read pointer and a write pointer referenced when making access to the logical register; and
a seventh circuit which selects a read pointer and a write pointer according to a first logical register number, a second logical register number and an opcode specified by the pointer setting instruction, adds an immediate specified by the pointer setting instruction and representing the difference between the two pointers to the pointer corresponding to the second logical register number, and writes back the calculated value to the read pointer or write pointer corresponding to the first logical register number.

24. A processor according to claim 16, further comprising:
a sixth circuit which executes a pointer setting instruction calling for setting the value of a read pointer and a write pointer referenced when making access to the logical register; and
a seventh circuit which selects a read pointer and a write pointer according to a first logical register number, a second logical register number and an opcode specified by the pointer setting instruction, adds an immediate specified by the pointer setting instruction and representing the difference between the two pointers to the pointer corresponding to the second logical register number, and writes back the calculated value to the read pointer or write pointer corresponding to the first logical register number.

25. A processor according to claim 15, further comprising:
a sixth circuit which executes a pointer setting instruction calling for setting the value of a read pointer and a write pointer referenced when making access to the logical register; and
a seventh circuit which sets the read pointer and write pointer to a predetermined value as a result of execution of the pointer setting instruction.

26. A processor according to claim 16, further comprising:
a sixth circuit which executes a pointer setting instruction calling for setting the value of a read pointer and a write pointer referenced when making access to the logical register; and
a seventh circuit which sets the read pointer and write pointer to a predetermined value as a result of execution of the pointer setting instruction.

27. A method of processing instructions each including at least a logical register number which specifies a logical register, comprising the steps of:
converting logical register numbers included in instructions to be executed into physical register numbers which correspond to a plurality of physical registers;
writing to different physical registers successively as specified by physical register numbers from said converting step, when said instructions are write instructions; and
reading from arbitrary locations the contents of physical registers as specified by physical register numbers from said converting step according to an order the physical registers are written into by said write instructions, when said instructions are read instructions.

28. A method according to claim 27, wherein said converting comprises the step of:
specifying said physical registers by read pointers and write pointers,
wherein said method further comprises the steps of:
reading a read pointer or a write pointer from said read pointers and write pointers according to said logical register number in said instruction to be executed, said instruction to be executed having a register control field, said register control field controlling the logical register number and the pointer corresponding to the logical register number, and according to the kind of access to the logical register specified by the logical register number, the access kind being determined by an opcode, and accessing a physical register in said register file by using the contents of the pointer as a physical register number;
responsive to the execution of said instruction including the logical register field, incrementing value of the read pointer or write pointer according to the value of the register control field and writing back the incremented value to said read pointers and write pointers; and
executing an instruction to set an arbitrary value in said read pointers and write pointers corresponding to the logical register number in the logical register field of said instruction.

29. A method according to claim 27, wherein logical registers having a part of a logical register number are fixedly assigned to the same physical register.

30. A method processor according to claim 28, further comprising the steps of:
executing a pointer setting instruction calling for setting the value of a read pointer and a write pointer referenced when making access to a logical register; and
selecting a read pointer and a write pointer according to the logical register number specified by the pointer setting instruction and setting an immediate specified by the pointer setting instruction into said read pointers and write pointers.

31. A method according to claim 29, further comprising the steps of:
executing a pointer setting instruction calling for setting the value of a read pointer and a write pointer referenced when making access to a logical register; and
selecting a read pointer and a write pointer according to the logical register number specified by the pointer setting instruction and setting an immediate specified by the pointer setting instruction into said read pointers and write pointers.

32. A method processor according to claim 28, further comprising the steps of:
executing a pointer setting instruction calling for setting the value of a read pointer and a write pointer referenced when making access to a logical register; and
selecting a read pointer and a write pointer according to a logical register number and opcode specified by the pointer setting instruction and setting an immediate specified by the pointer setting instruction into the selected pointer.

33. A method according to claim 29, further comprising the steps of:
executing a pointer setting instruction calling for setting the value of a read pointer and a write pointer referenced when making access to a logical register; and
selecting a read pointer and a write pointer according to a logical register number and opcode specified by the pointer setting instruction and setting an immediate specified by the pointer setting instruction into the selected pointer.

34. A method processor according to claim 28, further comprising the steps of:
executing a pointer setting instruction calling for setting the value of a read pointer and a write pointer referenced when making access to a logical register; and
selecting a read pointer and a write pointer according to a first logical register number and a second logical register number specified by the pointer setting instruction, adding an immediate specified by the pointer setting instruction representing a difference between said read pointer and said write pointer to said read pointers and write pointers corresponding to a second logical register number, and writing back a calculated value to said read pointers and write pointers corresponding to the first logical register number.

35. A method according to claim 29, further comprising the steps of:
executing a pointer setting instruction calling for setting the value of a read pointer and a write pointer referenced when making access to a logical register; and
selecting a read pointer and a write pointer according to a first logical register number and a second logical register number specified by the pointer setting instruction, adding an immediate specified by the pointer setting instruction representing a difference between said read pointer and said write pointer to said read pointers and write pointers corresponding to a second logical register number, and writing back a calculated value to said read pointers and write pointers corresponding to the first logical register number.

36. A method according to claim 28, further comprising the steps of:
executing a pointer setting instruction call for setting a value of a read pointer and a write pointer referenced when making access to a logical register; and
selecting a read pointer and a write pointer according to a first logical register number, a second logical register number and an opcode specified by the pointer setting instruction, adding an immediate specified by the pointer setting instruction representing a difference between said read pointer and said write pointer to the pointer corresponding to the second logical register number, and writing back the calculated value to the read pointer or write pointer corresponding to the first logical register number.

37. A method processor according to claim 29, further comprising the steps of:
executing a pointer setting instruction calling for setting a value of a read pointer and a write pointer referenced when making access to a logical register; and
selecting a read pointer and a write pointer according to a first logical register number, a second logical register number and an opcode specified by the pointer setting instruction, adding an immediate specified by the pointer setting instruction representing a difference between said read pointer and said write pointer to the pointer corresponding to the second logical register number, and writing back the calculated value to the read pointer or write pointer corresponding to the first logical register number.

38. A method according to claim 28, further comprising the steps of:
executing a pointer setting instruction calling for a setting a value of a read pointer and a write pointer referenced when making access to a logical register; and
setting the read pointer and write pointer to a predetermined value as a result of execution of the pointer setting instruction.

39. A method according to claim 29, further comprising the steps of:
executing a pointer setting instruction calling for setting a value of a read pointer and a write pointer referenced when making access to a logical register; and
setting the read pointer and write pointer to a predetermined value as a result of execution of the pointer setting instruction.

40. A method processing instructions comprising the steps of:
a plurality of logical registers specified by logical register numbers;
a register file having a plurality of physical registers specified by physical register numbers;
a converter which converts logical register numbers which correspond to logical registers into arbitrary physical register numbers which correspond to physical registers;
accessing different physical registers successively when a write instruction for writing into a first logical register is executed a plurality of times; and
reading from arbitrary locations the contents of physical registers in the order the physical registers were written into by the write instruction for the first logical register when a read instruction for reading from the logical register is executed a plurality of times.

41. A method according to claim 40, wherein said converting step comprises the step of:
specifying said physical registers by read pointers and write pointers;
reading a read pointer or a write pointer from read pointers or write pointers according to the logical register number in an instruction having a register control field, said register control field controlling the logical register number and the pointer corresponding to the logical register number, and according to the kind of access to the logical register specified by the logical register number, said access kind being determined by an opcode, and accesses a physical register in the register file by using the contents of the pointer as a physical register number; and incrementing the value of the read pointer or write pointer according to the value of the register control field representing the logical register number and writing back the incremented value to the read pointer or write pointer in the read pointers or write pointers; and executing an instruction to set an arbitrary value in the read pointer and write pointer corresponding to the logical register number in the logical register field of the instruction.

42. A method according to claim 40, wherein logical registers having a part of the logical register number of the logical register are fixedly assigned to the same physical register.

43. A method according to claim 41, further comprising the steps of:

executing a pointer setting instruction calling for setting the value of a read pointer and a write pointer referenced when making access to the logical register; and selecting a read pointer and a write pointer according to the logical register number specified by the pointer setting instruction and setting an immediate specified by the pointer setting instruction and representing a physical register number into the read pointer and write pointer.

44. A method according to claim 42, further comprising the steps of:

executing a pointer setting instruction calling for setting the value of a read pointer and a write pointer referenced when making access to the logical register; and selecting a read pointer and a write pointer according to the logical register number specified by the pointer setting instruction and setting an immediate specified by the pointer setting instruction and representing a physical register number into the read pointer and write pointer.

45. A method according to claim 41, further comprising the steps of:

executing a pointer setting instruction calling for setting the value of a read pointer and a write pointer referenced when making access to the logical register; and selecting a read pointer and a write pointer according to the logical register number and the opcode specified by the pointer setting instruction and setting an immediate specified by the pointer setting instruction and representing a physical register number into the selected pointer.

46. A method according to claim 42, further comprising the steps of:

executing a pointer setting instruction calling for setting the value of a read pointer and a write pointer referenced when making access to the logical register; and selecting a read pointer and a write pointer according to the logical register number and the opcode specified by the pointer setting instruction and setting an immediate specified by the pointer setting instruction and representing a physical register number into the selected pointer.

47. A method according to claim 41, further comprising the steps of:

executing a pointer setting instruction calling for setting the value of a read pointer and a write pointer referenced when making access to the logical register; and selecting read pointer and a write pointer according to a first logical register number and a second logical register number specified by the pointer setting instruction, adding an immediate specified by the pointer setting instruction and representing the difference between the two pointers to the read pointer and write pointer corresponding to the second logical register number, and writing back the calculated value to the read pointer and write pointer corresponding to the first logical register number.

48. A method according to claim 42, further comprising the steps of:

executing a pointer setting instruction calling for setting the value of a read pointer and a write pointer referenced when making access to the logical register; and selecting a read pointer and a write pointer according to a first logical register number and a second logical register number specified by the pointer setting instruction, adding an immediate specified by the pointer setting instruction and representing the difference between the two pointers to the read pointer and write pointer corresponding to the second logical register number, and writing back the calculated value to the read pointer and write pointer corresponding to the first logical register number.

49. A method according to claim 41, further comprising the steps of:

executing a pointer setting instruction calling for setting the value of a read pointer and a write pointer referenced when making access to the logical register; and selecting a read pointer and a write pointer according to a first logical register number, a second logical register number and an opcode specified by the pointer setting instruction, adding an immediate specified by the pointer setting instruction and representing the difference between the two pointers to the pointer corresponding to the second logical register number, and writing back the calculated value to the read pointer or write pointer corresponding to the first logical register number.

50. A method according to claim 42, further comprising the steps of:

executing a pointer setting instruction calling for setting the value of a read pointer and a write pointer referenced when making access to the logical register; and selecting a read pointer and a write pointer according to a first logical register number, a second logical register number and an opcode specified by the pointer setting instruction, adding an immediate specified by the pointer setting instruction and representing the difference between the two pointers to the pointer corresponding to the second logical register number, and writing back the calculated value to the read pointer or write pointer corresponding to the first logical register number.

51. A method according to claim 41, further comprising the steps of:

executing a pointer setting instruction calling for setting the value of a read pointer and a write pointer referenced when making access to the logical register; and setting the read pointer and write pointer to a predetermined value as a result of execution of the pointer setting instruction.

52. A method according to claim 42, further comprising the steps of:

executing a pointer setting instruction calling for setting the value of a read pointer and a write pointer referenced when making access to the logical register; and setting the read pointer and write pointer to a predetermined value as a result of execution of the pointer setting instruction.

* * * * *